(12) United States Patent
Shake et al.

(10) Patent No.: US 7,190,752 B2
(45) Date of Patent: Mar. 13, 2007

(54) DATA SIGNAL QUALITY EVALUATION METHOD AND APPARATUS USING HIGH SPEED SAMPLING

(75) Inventors: Ippei Shake, Yokohama (JP); Hidehiko Takara, Yokosuka (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 745 days.

(21) Appl. No.: 10/434,840

(22) Filed: May 9, 2003

(65) Prior Publication Data

US 2004/0005000 A1  Jan. 8, 2004

(30) Foreign Application Priority Data

May 14, 2002  (JP) ............................. 2002-139006
Apr. 23, 2003  (JP) ............................. 2003-118299

(51) Int. Cl.
*H04L 7/00* (2006.01)
(52) U.S. Cl. .................. 375/355; 341/13; 341/123; 341/126; 341/155
(58) Field of Classification Search ............... 375/355, 375/371, 372; 341/13, 122, 123, 126, 142, 341/155
See application file for complete search history.

(56) References Cited

U.S. PATENT DOCUMENTS

| 4,376,309 | A | | 3/1983 | Fenderson et al. |
| 4,941,151 | A | | 7/1990 | Abbiate et al. |
| 5,959,563 | A | * | 9/1999 | Ring .......................... 341/155 |
| 6,366,374 | B2 | * | 4/2002 | Bradshaw et al. ............ 398/17 |
| 6,587,530 | B1 | * | 7/2003 | Conklin et al. ............. 375/372 |
| 6,593,871 | B1 | * | 7/2003 | Miethig et al. ............. 341/157 |

FOREIGN PATENT DOCUMENTS

| EP | 0884868 | | 12/1998 |
| EP | 0920150 | A2 | 6/1999 |

(Continued)

OTHER PUBLICATIONS

"100 Gbit/s optical signal eye-diagram measurement with optical sampling using organic nonlinear optical crystal", H. Takara, et al., Electronics Letters, vol. 32, No. 24, Nov. 21, 1996, pp. 2256-2258.

(Continued)

*Primary Examiner*—Dac V. Ha
(74) *Attorney, Agent, or Firm*—Harness, Dickey & Pierce, PLC

(57) ABSTRACT

The scale and complexity of an apparatus is reduced by omitting a clock extraction section. The apparatus includes: a sampling pulse train generation device which generates an optical or electrical sampling pulse train, independently of an input optical or electrical data signal with a bit rate $f_0$(bit/s), and which has a repetition frequency $f_1$(Hz); a data signal sampling device which samples the data signal in accordance with the sampling pulse train to obtain a sampled signal; a voltage retaining device which converts the sampled signal, and stores pieces of electrical digital data; an electrical signal processing device which reads the digital data at once or sequentially to obtain a signal eye-diagram and evaluates optical data signal quality parameters; and a trigger signal generation device which applies triggers indicating the start/finish of data acquisition and data read to the voltage retaining device and the electrical signal processing device, respectively.

49 Claims, 10 Drawing Sheets

FOREIGN PATENT DOCUMENTS

| | | |
|---|---|---|
| JP | 01-217220 | 8/1989 |
| JP | 05-142095 | 6/1993 |
| JP | 06-237231 | 8/1994 |
| JP | 09/160082 | 6/1997 |

OTHER PUBLICATIONS

"Optical signal quality monitoring method based on optical sampling", I. Shake, et al., Electronics Letters, vol. 34, No. 22, Oct. 29, 1998, pp. 2152-2154.

"Handbok of Electronic Test Equipment (Section 5-8. Sampling Oscilloscope)", John D. Lenk, Prentice-Hall, Inc., Englewood Cliffs, NJ, 1971, pp. 184-189 plus 2 cover pages.

"Modeling of the HP-1430A Feedthrough Wide-Band (28-ps) Sampling Head" Sedki M. Riad, IEEE Transactions on Instrumentation and Measurement, vol. IM-31, No. 2, Jun. 1982, pp. 110-115.

\* cited by examiner

DATA SIGNAL QUALITY EVALUATION METHOD AND APPARATUS USING HIGH SPEED SAMPLING

BACKGROUND OF THE INVENTION

1. Field of the Invention

The present invention relates to a data signal quality evaluation method using high speed sampling, suitable for use when sampling an optical or electrical data signal with a predetermined bit rate and displaying an eye-diagram and measuring signal quality.

2. Description of the Related Art

A first example of a conventional optical signal quality evaluation apparatus is shown in FIG. 10 (see reference document "Handbook of ELECTRONIC TEST EQUIPMENT (Section 5–8. SAMPLING OSCILLOSCOPE), pp. 184–189, JOHN D. LENK, Prentice-Hall, Inc., Englewood Cliffs, N.J., 1971", reference document "Modeling of the HP-1430A Feedthrough Wide-Band (28-ps) Sampling Head, SEDKI M. RIAD, IEEE Transactions on Instrumentation and Measurement, Vol. IM-31, No. 2, June 1982, pp. 110–115", for example). This conventional optical signal quality evaluation apparatus comprises an opto-electric conversion device 101 which converts an optical signal with a bit rate of $f_0$ (bit/s) into an electric intensity modulated signal, a clock extraction device 102 which extracts a clock from the electric intensity modulated signal, a sampling clock generation device which generates a sampling clock with a repetition frequency of $f_1(Hz)(f_1=(n/m)f_0+a$, where n and m are natural numbers, and a is the offset frequency) synchronized with the clock extracted by the clock extraction device 102, and an electrical signal processing device 104. The electrical signal processing device 104 samples the electric intensity modulated signal input via the clock extraction device 102 in accordance with the sampling clock, and displays a sampled data distribution sequentially based on the obtained sampled electrical signal, thereby obtaining a signal eye-diagram, and evaluates the optical signal quality parameters.

As a second conventional example, resembling the first conventional example described above, there are optical sampling devices using a sampling optical pulse train having a repetition frequency of $f_1(Hz)(f_1(n/m)f_0+a$, where n and m are natural numbers and a is the offset frequency) and a pulse width sufficiently narrower than a timeslot of an optical signal, and optical sampling devices using a sampling clock (see Japanese Patent No. 2677372, Japanese Patent No. 3239925, reference document "100 Gbit/s optical signal eye-diagram measurement with optical sampling using organic nonlinear optical crystal, H. Takara, S. Kawanishi, A. Yokoo, S. Tomaru, T. Kitoh and M. Saruwatari, Electronics Letters, Vol. 32, No. 24, 21st Nov. 1996, pp. 2256–2258", for example). These optical sampling devices are provided before the opto-electric conversion device. In these examples, an optical splitter splits the optical signal, and optical sampling is performed using a sampling clock or a sampling optical pulse train synchronized with the clock obtained by performing clock extraction from one of the split optical signals. The sampled optical signal is then converted into a sampled electrical signal by the opto-electric conversion device. The electrical signal processing device then displays sequentially a sampled data distribution based on the obtained sampled electrical signal, thereby obtaining a signal eye-diagram, and evaluates the optical signal quality parameters.

The repetition frequency of the sampling clock in the first conventional example is normally within the range of several dozen to several hundred kHz, and it takes time to obtain a signal eye-diagram which is necessary and sufficient for evaluation, and therefore wander of the optical signal becomes an issue. Consequently, clock extraction was essential. In the second conventional example in which optical sampling is performed by the sampling clock or the sampling optical pulse train, the repetition frequency of the sampling clock or the sampling optical pulse train is approximately 10 MHz, but because it is necessary to perform the electrical signal processing to determine the sampled data distribution sequentially, the effective sampling rate decreases, and it takes time to obtain a necessary and sufficient signal eye-diagram for evaluation, and therefore wander of the optical signal becomes an issue. Consequently, clock extraction was essential.

As described above, because clock extraction is required in both the first and second conventional examples, this presents such problems as increases in the scale of the apparatus, increases in the complexity of the method or apparatus, and increases in the cost of the apparatus. An optical signal monitoring apparatus using asynchronous sampling (see European Patent Application Publication No. EP 0920150 A2, reference document "Optical signal quality monitoring method based on optical sampling, I. Shake, H. Takara, S. Kawanishi and Y. Yamabayashi, Electronics Letters, Vol. 34, No. 22, 29th Oct. 1998, pp. 2152–2154", for example), is proposed as a third conventional example, as an optical signal monitoring apparatus which does not require clock extraction. However, because this method evaluates an optical signal intensity distribution based on an asynchronous eye-diagram, it still cannot be applied to degradation in the time domain (such as jitter and polarization dispersion).

SUMMARY OF THE INVENTION

In accordance with the above circumstances, an object of the present invention is to provide a data signal quality evaluation method and apparatus which by omitting a clock extraction section, enables the scale of the apparatus to be reduced, which allows the method or the apparatus to be simplified, and which allows the cost of the apparatus to be reduced, and which is capable of monitoring not only signal-to-noise ratio (SNR) degradation and wavelength dispersion degradation, but also signal quality degradation in the time domain, such as jitter and polarization dispersion degradation.

In order to achieve the above objects, the data signal quality evaluation method of the present invention comprises the steps of: after repeating N times (where N is a natural number) a process in which an input optical or electrical data signal with a bit rate of $f_0$(bit/s) is sampled using an optical or electrical sampling pulse train, which is generated independently of the data signal, and which has a repetition frequency $f_1$(Hz) which differs from the bit rate $f_0$(bit/s), a thus obtained optical or electrical sampled signal is converted into a piece of electrical digital data, and the piece of the electrical digital data is stored in a buffer, reading N pieces of the electrical digital data stored in the buffer at once or sequentially and performing electrical signal processing of the N pieces of the electrical digital data, to obtain a signal eye-diagram and to perform data signal waveform measurement and quality evaluation.

Furthermore, the data signal quality evaluation apparatus of the present invention comprises a sampling pulse train generation device which generates an optical or electrical sampling pulse train, independently of an input optical or electrical data signal with a bit rate of $f_0$(bit/s), and which has a repetition frequency $f_1$(Hz) which differs from the bit rate $f_0$(bit/s); a data signal sampling device which samples the data signal with the bit rate $f_0$(bit/s) in accordance with the sampling pulse train to obtain a sampled signal; a voltage retaining device which converts the sampled signal which is an optical or electrical sampled signal obtained by means of the data signal sampling device into a piece of electrical digital data, and stores a plurality of pieces of the electrical digital data; an electrical signal processing device which reads the plurality of pieces of the electrical digital data stored in the voltage retaining device at once or sequentially to obtain a signal eye-diagram and to evaluate optical data signal quality parameters; and a trigger signal generation device which applies triggers indicating the start/finish of data acquisition to the voltage retaining device, and applies triggers indicating the start/finish of data read to the electrical signal processing device.

The present invention can provide a data signal quality evaluation method and apparatus, in which a reduction in the scale of the apparatus, simplification of the method and the apparatus, and a reduction in the cost of the apparatus can be achieved due to the fact that a clock extraction section is omitted, and in which by acquiring data using high speed sampling and a buffer, a pseudo-synchronized optical signal eye-diagram unaffected by wander can be obtained despite the lack of a synchronizing device, and which can monitor not only signal-to-noise ratio (SNR) degradation and wavelength dispersion degradation, but also signal quality degradation in the time domain, such as jitter and polarization dispersion degradation.

Furthermore, by using an optical sampling method, the present invention can be applied to a wider range of optical signal bit rates than methods in which electrical sampling methods are used.

DETAILED DESCRIPTION OF THE PREFERRED EMBODIMENTS

First Embodiment

Figure 1:
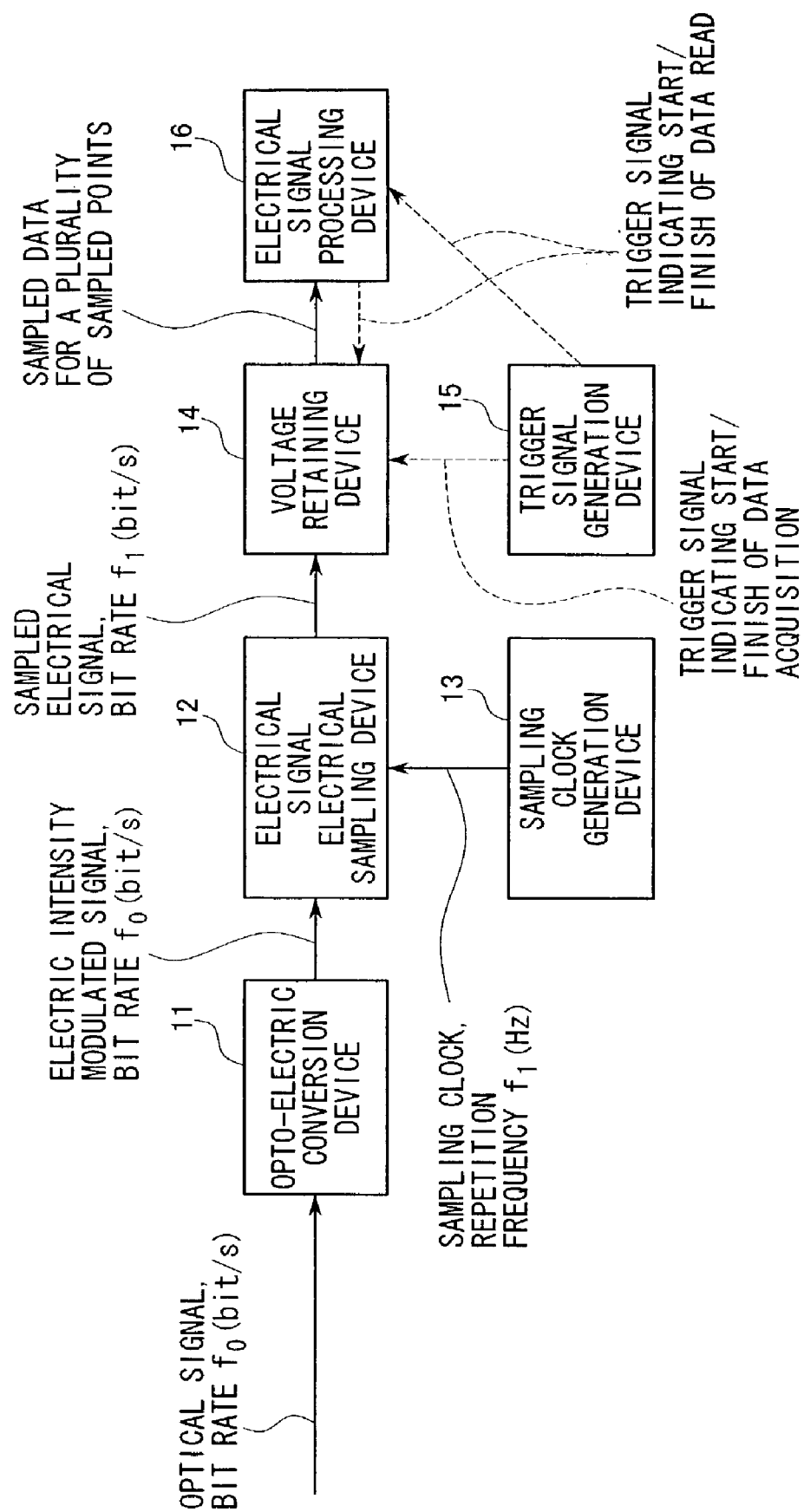
FIG. 1 is a block diagram showing the construction of a first embodiment of the present invention.

A first embodiment of a data signal quality evaluation apparatus according to the present invention is shown in FIG. 1. This embodiment is in accordance with the invention as disclosed in claim 10. In the present embodiment, an electrical signal electrical sampling device 12 is used as the data signal sampling device. In the case of the present embodiment, the input data signal is an electrical data signal, and a sampling clock generation device 13 is used as the sampling pulse train generation device. FIG. 1 shows a specific case in which an optical signal with a bit rate $f_0$(bit/s) is converted into an electric intensity modulated signal via an opto-electric conversion device 11 and then input into the electrical signal electrical sampling device 12. However, in a case in which an electrical signal with a bit rate $f_0$(bit/s) is input directly into the electrical signal electrical sampling device 12, the opto-electric conversion device 11 is unnecessary, and such an embodiment is also included in the present embodiment. The operation of the present embodiment is described below.

The optical signal with a bit rate $f_0$(bit/s) arrives at the electrical signal electrical sampling device 12 via the opto-electric conversion device 11 as an electric intensity modulated signal. In addition, a sampling clock is generated by the sampling clock generation device 13 at a repetition frequency of $f_1$(Hz)($f_1=(n/m)$ $f_0+a$, or $f_1=(n/m)f_0-a$, where n and m are natural numbers, and a is the offset frequency). The electrical signal electrical sampling device 12 samples the electric intensity modulated signal in accordance with this sampling clock to obtain a sampled electrical signal. A voltage retaining device 14 performs analog/digital conversion (A/D conversion) of the sampled electrical signal, and then performs a temporary memory storage operation in response to trigger signals from a trigger signal generation device 15 indicating the start of data acquisition. The voltage retaining device 14 stores a plurality of pieces of sampled data for the time until a trigger signal indicating the finish of data acquisition is sent from the trigger signal generation device 15. The plurality of pieces of the sampled data are then output according to a trigger signal from an external source. Here for example, a high-speed A/D conversion circuit which comprises an electrical buffer memory with a capacity equal to or greater than a kilobyte and which has the function of MHz to GHz sampling could be used. Furthermore, the sampling gate width of the sampling clock is preferably less than ¼ or thereabouts of the time determined by the reciprocal of the bit rate $f_0$ of the optical signal.

After data acquisition has been performed for a fixed period of time and a plurality of pieces of sampled data have been stored in the voltage retaining device 14, the trigger signal generation device 15 sends a trigger signal indicating the start of data read to an Electrical signal processing device 16. Then the electrical signal processing device 16 starts the reading of the plurality of pieces of the sampled data from the voltage retaining device 14 in response to the trigger signal indicating the start of data read, obtains a signal eye-diagram from the plurality of pieces of the sampled data, and performs such functions as displaying the signal eye-diagram and performing predetermined arithmetic processing relating to signal-to-noise ratio (SNR) degradation, wavelength dispersion degradation, and signal quality degradation in the time domain such as jitter and polarization dispersion degradation and displaying the results of the predetermined arithmetic processing so that the optical signal quality parameters can be evaluated, or outputting the results to a predetermined external device.

Here, the repetition frequency $f_1$ of the sampling clock is determined based only on the number $(n/m)f_1$ which is related to the optical signal bit rate $f_0$, and is not made to follow the bit phase of the optical signal using clock extraction or the like. For example, here a case in which the optical signal bit rate is one of either 2.5 Gbit/A, 10 Gbit/s or 40 Gbit/s is considered. In this case, if 100 MHz which is one of the common measures of these bit rates is known as the information required to determine the repetition frequency of the sampling clock, $f_1$ can be determined based on this figure. For example, if the repetition frequency of the sampling clock is set to (100 MHz+a Hz), and it is assumed that 15000 pieces of sampled data are required, then a data acquisition time of approximately 150 µs is required. In other words, in this method, the only bit phase shift caused by wander which affects the eye-diagram used in the evaluation is the variation within approximately 150 µs. If the temperature difference within one day is 60° C. (over 12 hours), then the temperature variation within 150 µs is approximately $2.1 \times 10^{-7}$ ° C. Taking into consideration the fact that the maximum amount of pulse delay in a nylon coated quartz fiber which forms the transmission line of the optical signal is approximately 0.2 ps/m/° C. (actual measured value), the amount of pulse delay caused by variation in the temperature of the whole transmission line of 100 km according to air temperature variation is $4.2 \times 10^{-3}$ ps within 150 µs. Because this value is small enough to be ignored not only in electrical sampling at a resolution of approximately 20 µs but even in optical signal optical sampling at a resolution of approximately 1 ps, the eye-diagram according to the present method can be evaluated as if it is a synchronous eye-diagram.

An example of a suitable range for setting the offset frequency a is $$\frac{\left(\frac{n}{m}\right)^2 q}{k+\left(\frac{n}{m}\right)q} f_0 \leq a < \frac{\left(\frac{n}{m}\right)^2 q}{k-1+\left(\frac{n}{m}\right)q} f_0$$

(where k and q are natural numbers) for example.

Here, what n/m, k, and q refer to is described in detail in the "display examples of eye-diagrams according to the embodiments" below.

Furthermore, the input signal (data signal) in the data signal quality evaluation apparatus of the present invention is not limited to an optical signal with a bit rate $f_0$(bit/s) as described above, and may be an electrical signal with a bit rate $f_0$(bit/s). In such a case, in the embodiment shown in FIG. 1, the opto-electric conversion device 11 may be omitted, and the input electrical signal with a bit rate $f_0$ input directly into the electrical signal electrical sampling device 12, for example.

Furthermore, to not have the repetition frequency $f_1$ of the sampling clock follow the bit phase of the optical signal (or the electrical signal) using clock extraction or the like, means generating a sampling signal with a repetition frequency $f_1$(Hz) independently of the data signal. Here, "independently" means that the relationship between the bit phases of the data signal and the sampling signal do not constantly track each other.

Moreover, in the reading of a plurality of pieces of sampled data from the voltage retaining device 14 by the electrical signal processing device 16, the plurality of pieces of the sampled data may be read at once, or sequentially.

Second Embodiment

Figure 2:
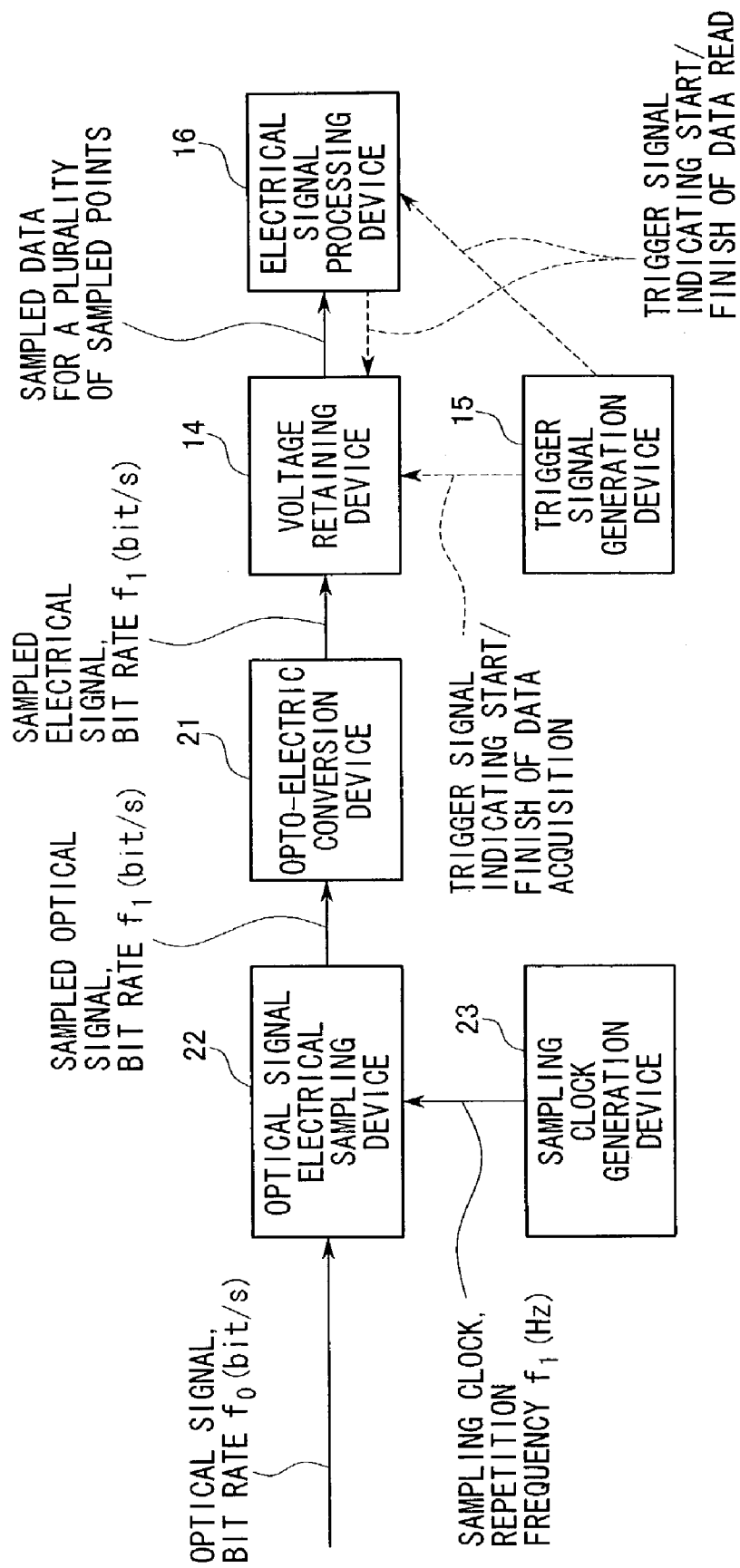
FIG. 2 is a block diagram showing the construction of a second embodiment of the present invention.

A second embodiment of a data signal quality evaluation apparatus of the present invention is shown in FIG. 2. This embodiment is in accordance with the invention as disclosed in claim 10. In the present embodiment, an optical signal electrical sampling device 22 is used as the data signal sampling device. In such a case, the input data signal is an optical data signal, and a sampling clock generation device 23 is used as the sampling pulse train generation device. In this case, because a sampled optical signal is obtained by the optical signal electrical sampling device 22, then in order to convert the sampled signal into a piece of electrical digital data and store the piece of the electrical digital data, it is necessary to perform analog/digital conversion after performing opto-electric conversion. Consequently, the construction shown in FIG. 2 is such that a voltage retaining device 14 having an analog/digital conversion function is provided after the opto-electric conversion device 21. In FIG. 2, those structural elements which are the same as in FIG. 1 are given the same reference numerals. The operation of the present embodiment is described below.

An optical signal with a bit rate of $f_0$(bit/s) arrives at the optical signal electrical sampling device 22. In addition, a sampling clock is generated by the sampling clock generation device 23 at a repetition frequency of $f_1$(Hz)($f_1=(n/m)f_0+a$ or $f_1=(n/m)f_0-a$, where n and m are natural numbers and a is the offset frequency), and arrives at the optical signal electrical sampling device 22. Here, devices such as electrical short pulse generation by means of a combination of a synthesized signal generator and a comb generator can be used as the sampling clock generation device 23. In addition, it is preferable that the repetition frequency $f_1$ of the sampling clock is high-speed, in the MHz to GHz region. Furthermore, it is preferable that the frequency band of the comb generator is extended to approximately four times the bit rate $f_0$ of the optical signal, and that the pulse width of the electrical short pulse is set to approximately the time width as determined by the Fourier transform of the frequency band of the comb generator. Moreover, an electric amplifier could be used before or after the comb generator as needed. Additionally, a baseband clipper could be used after the comb generator as needed.

In the optical signal electrical sampling device 22, the optical signal is sampled in accordance with the sampling clock to obtain a sampled optical signal with a bit rate $f_1$. In the optical signal electrical sampling device 22, a gate operation performed by an electro-absorption optical modulator, or the like, may be used. Here, the transmission band of the optical signal of the optical signal electrical sampling device 22 is preferably close to the optical signal bit rate $f_0$. Furthermore, the sampling gate width of the optical signal electrical sampling device 22 is preferably equal to or less than ¼ or thereabouts of the time determined by the reciprocal of the bit rate $f_0$ of the optical signal. The sampled optical signal is then converted into a sampled electrical signal by the opto-electric conversion device 21.

The voltage retaining device 14 performs analog/digital conversion (A/D conversion) of the sampled electrical signal, and then performs a temporary storage operation in response to trigger signals from the trigger signal generation device 15 indicating the start of data acquisition. The voltage retaining device 14 stores a plurality of pieces of sampled data for the time until a trigger signal indicating the finish of data acquisition is sent from the trigger signal generation device 15, and outputs the plurality of pieces of the sampled data according to a trigger signal from an external source. Here for example, a high speed A/D conversion circuit which comprises an electrical buffer memory with a capacity equal to or greater than a kilobyte and which has the function of MHz to GHz sampling could be used. After data acquisition has been performed for a fixed period of time and a plurality of pieces of sampled data have been stored in the voltage retaining device 14, a trigger signal indicating the start of data read is sent from the trigger signal Generation device 15 to the electrical signal processing device 16. Then the electrical signal processing device 16 starts the reading the plurality of pieces of the sampled data from the voltage retaining device 14 in response to the trigger signal indicating the start of data read, obtains the signal eye-diagram from the plurality of pieces of the sampled data, and evaluates the optical signal quality parameters.

Third Embodiment

Figure 3:
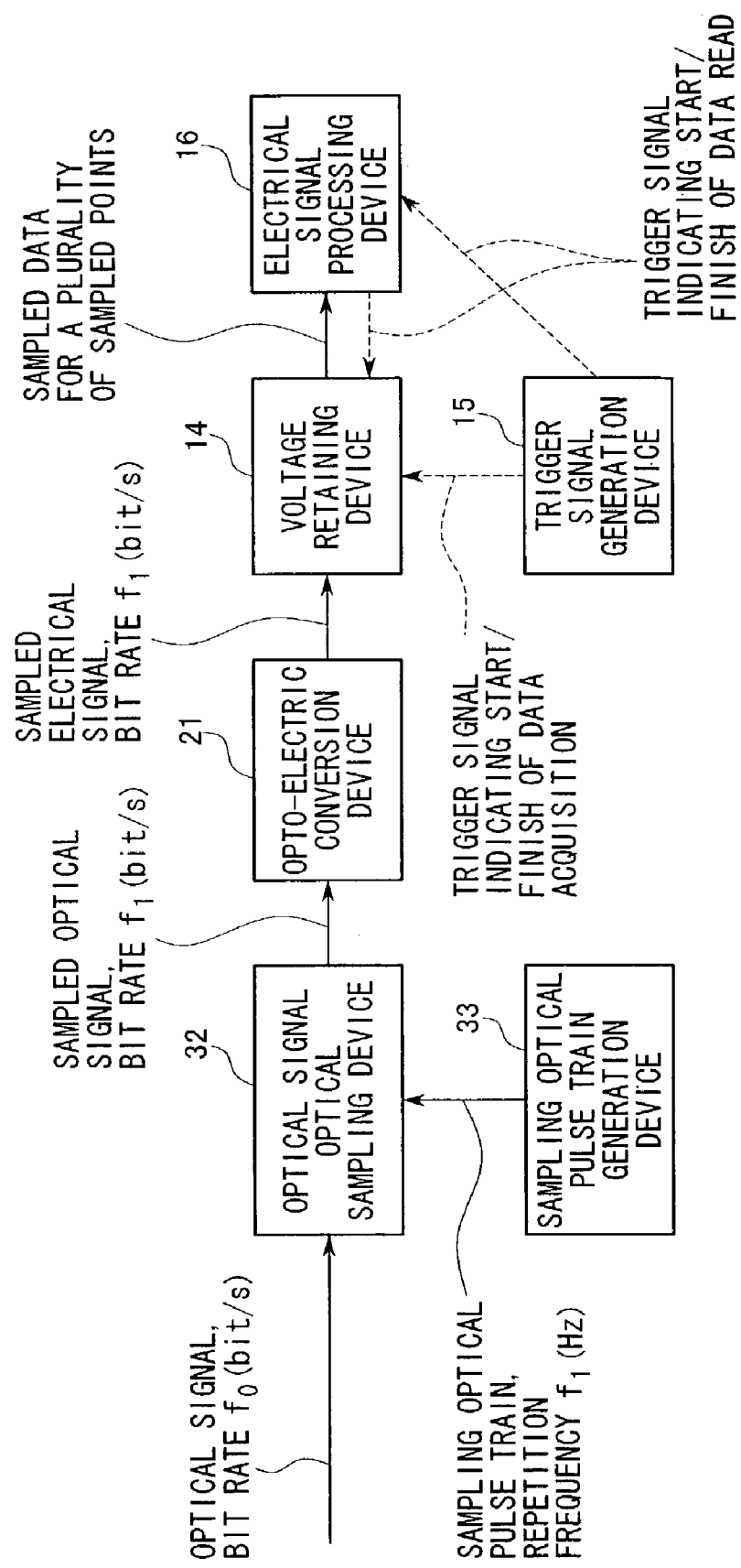
FIG. 3 is a block diagram showing the construction of a third embodiment of the present invention.

A third embodiment of a data signal quality evaluation apparatus of the present invention is shown in FIG. 3. This embodiment is in accordance with the invention as disclosed in claim 10. In the present embodiment, an optical signal optical sampling device 32 is used as the data signal sampling device. In such a case, the input data signal is an optical data signal, and a sampling optical pulse train generation device 33 is used as the sampling pulse train generation device. In this case, because a sampled optical signal is obtained by the optical signal optical sampling device 32, then in order to convert the sampled signal into a piece of electrical digital data and store the piece of electrical digital data, it is necessary to perform analog/digital conversion after performing opto-electric conversion. Consequently, the construction shown in FIG. 3 is such that a voltage retaining device 14 having an analog/digital conversion function is provided after the opto-electric conversion device 21. In FIG. 3, those structural elements which are the same as in FIG. 1 or FIG. 2 are given the same reference numerals. The operation of the present embodiment is described below.

An optical signal with a bit rate $f_0$(bit/s) arrives at the optical signal optical sampling device 32. In addition, a sampling optical pulse train is generated by the sampling optical pulse train generation device 33 at a repetition frequency $f_1$(Hz)($f_1=(n/m)f_0+a$ or $f_1=(n/m)f_0-a$, where n and m are natural numbers and a is the offset frequency), and arrives at the optical signal optical sampling device 32. Here, the sampling optical pulse train has a pulse width sufficiently smaller than the time determined by the reciprocal of the bit rate $f_0$ of the optical signal. Gain switching type laser diodes, fiber ring lasers and mode locking laser diodes and the like can be used as the sampling optical pulse train generation device 33. Here, it is preferable that the repetition frequency $f_1$ of the sampling optical pulse train is high-speed, in the MHz to GHz region. Furthermore, the pulse width of the sampling optical pulse train is preferably equal to or less than ¼ of the time determined by the reciprocal of the bit rate $f_0$ of the optical signal.

The optical signal optical sampling device 32 samples the optical signal in accordance with the sampling optical pulse train to obtain a sampled optical signal. Here, a nonlinear optical effect between the optical signal and the sampling optical pulse train can be used for the optical signal optical sampling device 32, and a nonlinear optical medium such as KTP (KTiOPO$_4$), AANP (2-adamantylamino-5-nitropyridine) or PPLN (Periodically Poled Lithium Niobate) can be used for this purpose. Furthermore, SFG (sum frequency (optical signal) generation), SHG (second-order harmonic (optical signal) generation) or FWM (four wave mixing) can be employed as the nonlinear optical effect.

The sampled optical signal is converted into a sampled electrical signal by the opto-electric conversion device 21. The voltage retaining device 14 performs analog/digital conversion (A/D conversion) of the sampled electrical signal, and then performs a temporary memory storage operation in response to trigger signals from a trigger signal generation device 15 indicating the start of data acquisition. The voltage retaining device 14 stores a plurality of pieces of sampled data for the time until a trigger signal indicating the finish of data acquisition is sent from the trigger signal generation device 15, and outputs the plurality of pieces of the sampled data according to a trigger signal from an external source. Here for example, a high speed A/D conversion circuit which comprises an electrical buffer memory with a capacity equal to or greater than a kilobyte and which has the function of MHz to GHz sampling could be used. After data acquisition has been performed for a fixed period of time and a plurality of pieces of sampled data have been stored in the voltage retaining device 14, a trigger signal indicating the start of data reading is sent from the trigger signal generation device 15 to the electrical signal processing device 16. Then the electrical signal processing device 16 starts the reading of the plurality of pieces of the sampled data from the voltage retaining device 14 in response to the trigger signal indicating the start of data read, obtains the signal eye-diagram from the plurality of pieces of the sampled data, and evaluates the optical signal quality parameters.

Fourth Embodiment

In this embodiment, an example of an evaluation procedure for use when an accurate value is not known for the signal bit rate $f_0$ is described. First, if the signal format is known, the signal bit rate can be assumed to be in the case of SDH, for example, one of either 2.48832 Gbit/s, 9.95328 Gbit/s, 39.81312 Gbit/s, . . . . However, to be accurate, it can be assumed that there is actually deviation of df (Hz) in the signal bit rate, and in the case of SDH, for example, there is an allowance of df=±200 ppm. Assuming actual deviation of df in the bit rate, if the repetition frequency of the sampling clock is determined based on, for example, a common measure of 2.48832 Gbit/s, 9.95328 Gbit/s and 39.81312 Gbit/s without-taking df into consideration, deviation also occurs in $f_1$ by an amount attributable to df. If this $f_1$ satisfies $f_1(n/m)f_0\pm a$ (where M and m are natural numbers) and $(n/m)^2 q/\{k+(n/m)q\}f_0 \leq a < (n/m)^2 q/\{k+(n/m)q-1\}f_0$ (where k is a natural number), the measurement of an open eye-diagram can be achieved. If $f_1$ does not satisfy these conditions, the measurement of an open eye-diagram can be achieved by sweeping the value of $f_1$ or sweeping at least one of the value of $f_1$, the value of k, the value of n/m and the value of q so that $ikj \leq Nsamp$ and $ikj \leq kz/\{2q(k-z)\}$ (where i,j, and Nsamp are natural numbers) are satisfied. What n/m, k, q, and z refer to is described in detail in the "display examples of eye-diagrams according to the embodiments" below. This method of sweeping these parameters can be applied not only to a case where the signal bit rate is known to a certain extent based on the signal format, but also to a case when the signal bit rate is completely unknown. However, in such a case, the demand for the variable width of $f_1$ is greater.

The condition under which eye-diagram measurement is possible without sweeping the value of $f_1$ is $f_1 \geq (2 \cdot f_0 \cdot \text{Nsamp} \cdot |df|)_{1/2}$. Therefore, if $f_0 = 9.95328$ Gbit/s, df=200 ppm and Nsamp=250, for example, then $f_0 \geq$ the order of 1 GHz, and by using a high speed sampling rate, eye-diagram measurement is possible even in a case where the signal bit rate cannot be known accurately.

Quality Evaluation Examples According to the Embodiments

Examples of quality evaluation according to the first embodiment to the fourth embodiment of the present invention are described with reference to FIG. 4 through FIG. 8. Each diagram shows an example of a typical synchronous eye-diagram and an example of the evaluation parameters.

Figure 4:
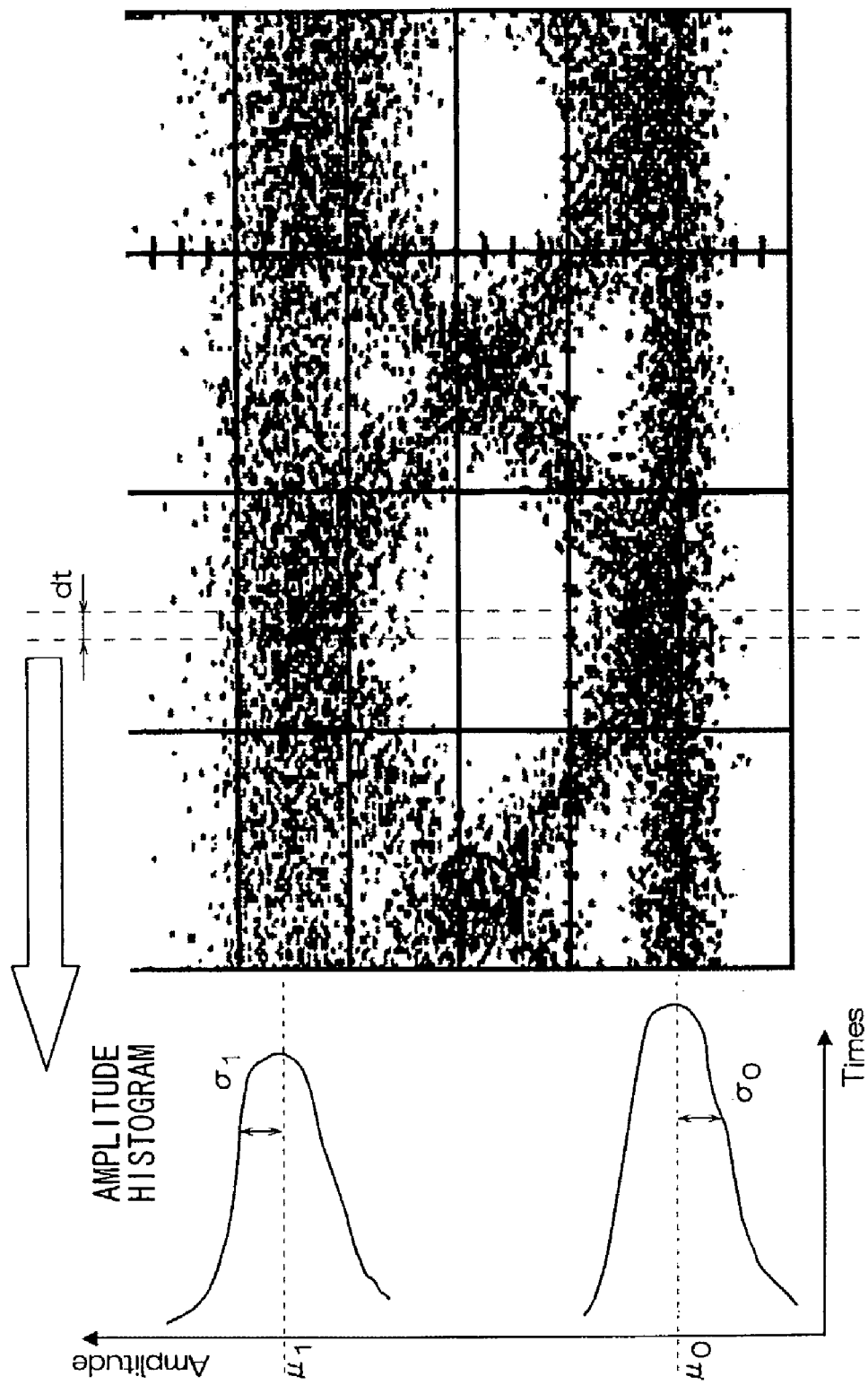
FIG. 4 is a diagram showing an example of data signal quality evaluation according to the embodiments shown in FIG. 1 to FIG. 3.

FIG. 4 shows an example of an eye-diagram-for an NRZ signal(Non-Return-to-Zero signal). An amplitude histogram is shown for a case in which the time window of dt is set centered about the time when the eye opening is the largest in the intensity domain. The means $\mu_1$ and $\mu_0$ and the standard deviations $\sigma_1$ and $\sigma_0$ are evaluated for the distributions of the mark and space levels, respectively.

Furthermore, the Q-factor determined by $$Q = |\mu_1 - \mu_0| / \sigma_1 + \sigma_0$$

can be used as an evaluation parameter. Here, $|\mu_1 - \mu_0|$ is the absolute value of the difference between the means $\mu_1$ and $\mu_0$.

The bit error rate can be estimated from the Q-factor, using BER=erfc(Q). Here, BER is the Bit Error Rate, and erfc is the complementary error function.

Figure 5:
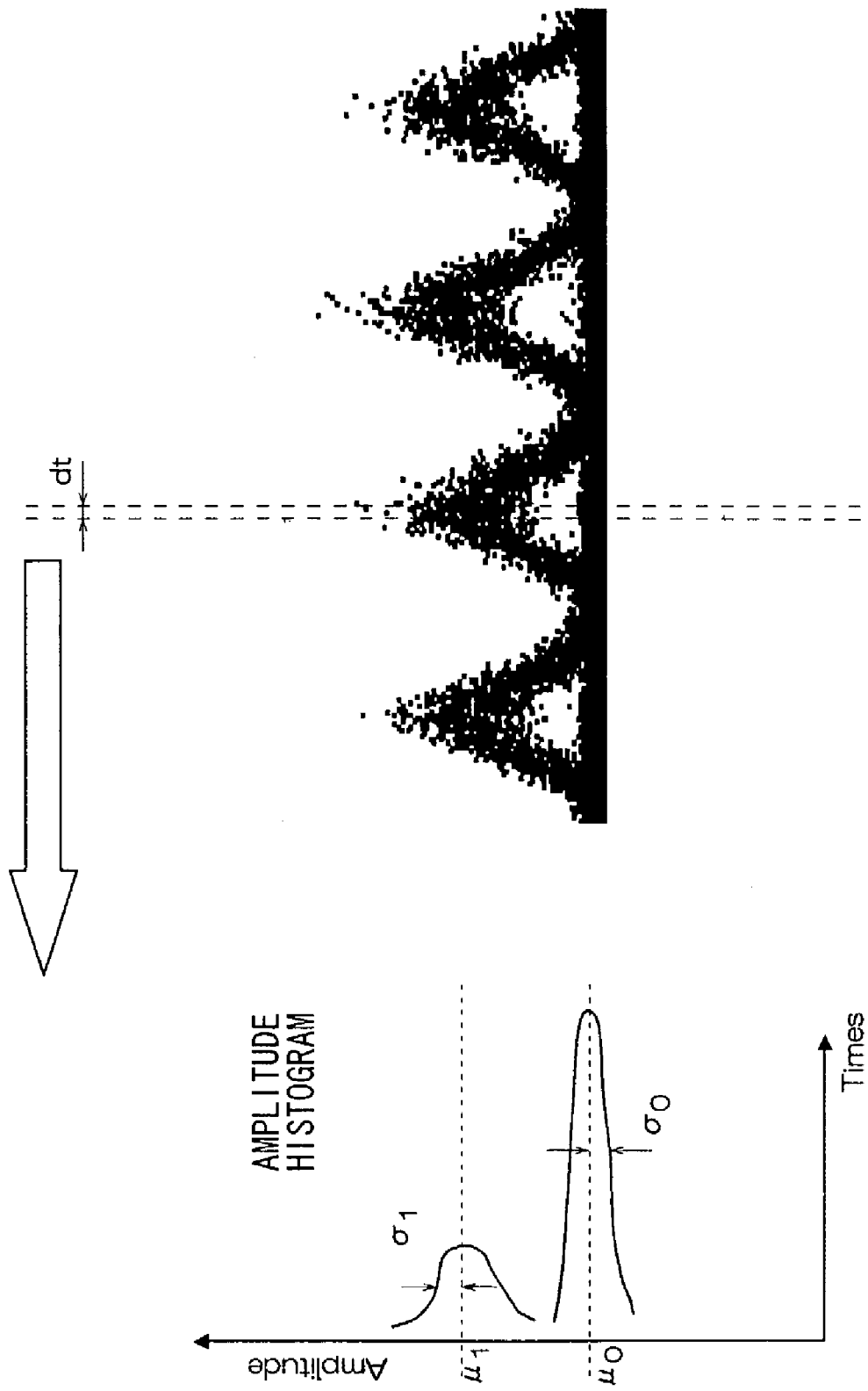
FIG. 5 is a diagram showing another example of data signal quality evaluation according to the embodiments shown in FIG. 1 to FIG. 3.

FIG. 5 shows an example of an eye-diagram for an RZ signal (Return-to-Zero signal). The means $\mu_1$, $\mu_0$, the standard deviations $\sigma_1$, $\sigma_0$ and the Q-factor are evaluated in the same manner as described above for an NRZ signal.

Figure 6:
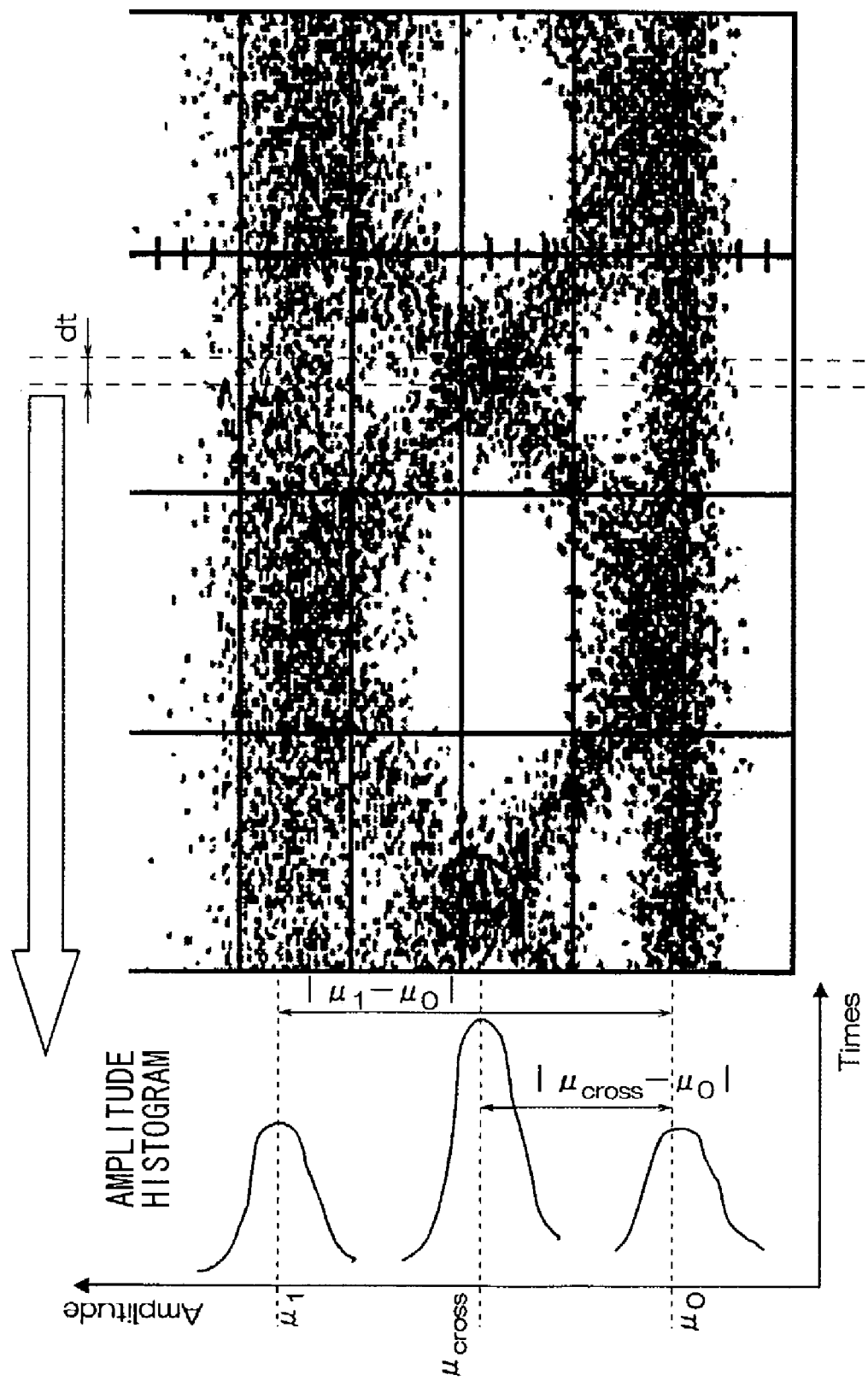
FIG. 6 is a diagram showing another example of data signal quality evaluation according to the embodiments shown in FIG. 1 to FIG. 3.

FIG. 6 shows an example of an eye-diagram of an NRZ signal. An amplitude histogram is shown in which the time window of dt is set with the cross-point of the eye-diagram as its center. The means $\mu_1$, $\mu_0$ and $\mu_{cross}$ are evaluated for the distributions of the mark and space levels and the frequency distribution near the cross-point, respectively.

As an example, $R_{cross} = |\mu_{cross} - \mu_0| / |\mu_1 - \mu_0|$ indicates the deviation in the amplitude intensity at the cross-point, and is therefore a parameter for evaluating the effect of pulse broadening caused by wavelength dispersion or the like.

Figure 7:
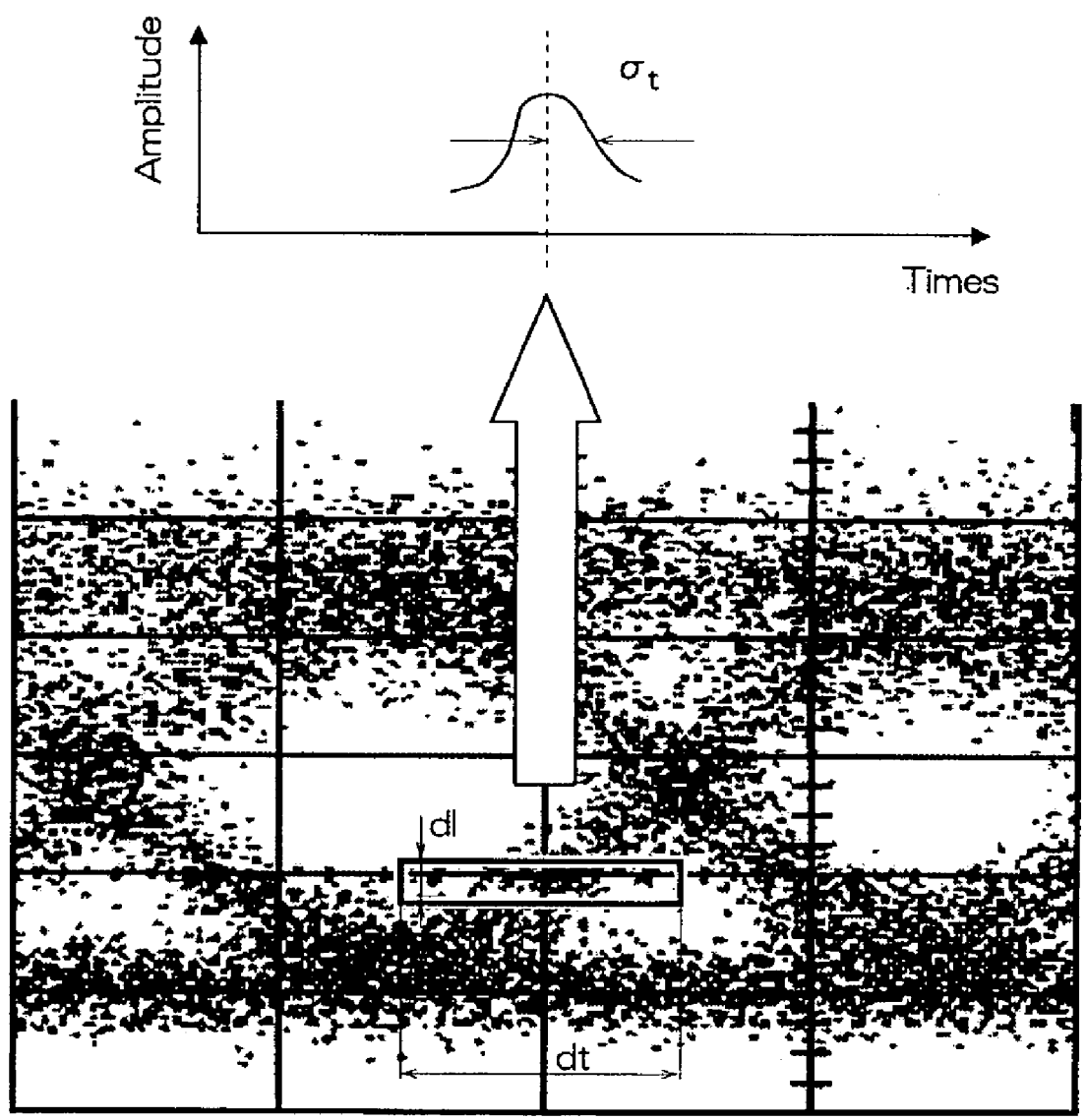
FIG. 7 is a diagram showing another example of data signal quality evaluation according to the embodiments shown in FIG. 1 to FIG. 3.

FIG. 7 shows an example of an eye-diagram for an NRZ signal. This diagram shows a time histogram of the section defined by the time width dt and the intensity width dI, and in this example the standard deviation $\sigma_1$ is evaluated. $\sigma_1$ is a parameter for evaluating the effects of jitter.

Figure 8:
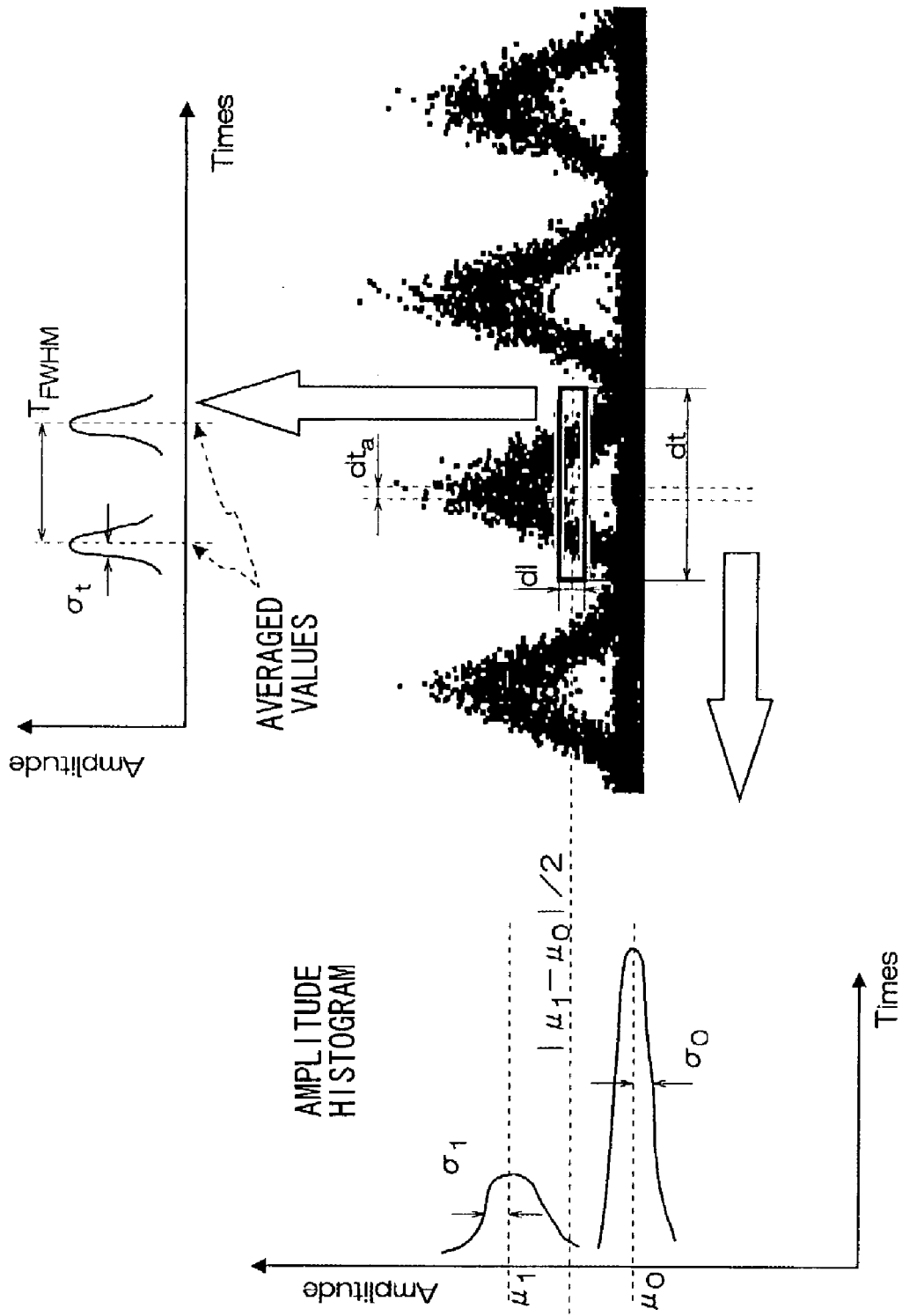
FIG. 8 is a diagram showing another example of data signal quality evaluation according to the embodiments shown in FIG. 1 to FIG. 3.

FIG. 8 is an example of an eye-diagram for an RZ signal. The diagram on the left shows an amplitude histogram in which the time window of $dt_a$ is set with the time when the eye opening in the intensity domain is the largest as its center, and the means $\mu_1$ and $\mu_0$ are evaluated for the distributions of the mark and space levels, respectively. The diagram at the top shows a time histogram of the section defined by the time width dt and the intensity width dI, centered on the value of $|\mu_1 - \mu_0|/2$, and in this example the standard deviation $\sigma_1$ and the difference between the means $T_{FWHM}$ are evaluated. $\sigma_1$ is a parameter for evaluating the effects of jitter. $T_{FWHM}$ indicates the full width at half maximum of the RZ pulse, which is a parameter for evaluating the pulse broadening caused by wavelength dispersion.

In addition, by setting the windows of the time width dt and the frequency width dI arbitrarily, it is possible to evaluate the degradation caused by PMD (polarization mode dispersion) and the like.

Display Examples of Eye-diagrams According to the Embodiments

Regarding the display of eye-diagrams, a plurality of pieces of sampled data can be displayed on a display device as is, in the order in which they were sampled. In such a case, instead of arranging every sampled point in a time series, the sampled points may be superposed from time zero at an interval of a certain period. An eye-diagram can be displayed by repeating this process for every sampled point.

The superposition period is described below. Here, a case is described in which when the bit rate of the data signal is $f_0$(bit/s), and the repetition frequency $f_1$(Hz) of the sampling is represented by $f_1 = (n/m)f_0 + a$, or $f_1 = (n/m)f_0 - a$ (where, L and in are natural numbers, and a is the offset frequency), a satisfies the condition $$\frac{\left(\frac{n}{m}\right)^2 q}{k + \left(\frac{n}{m}\right)q} f_0 \leq a < \frac{\left(\frac{n}{m}\right)^2 q}{k - 1 + \left(\frac{n}{m}\right)q} f_0$$

(where k and q and natural numbers)

Figure 9A:
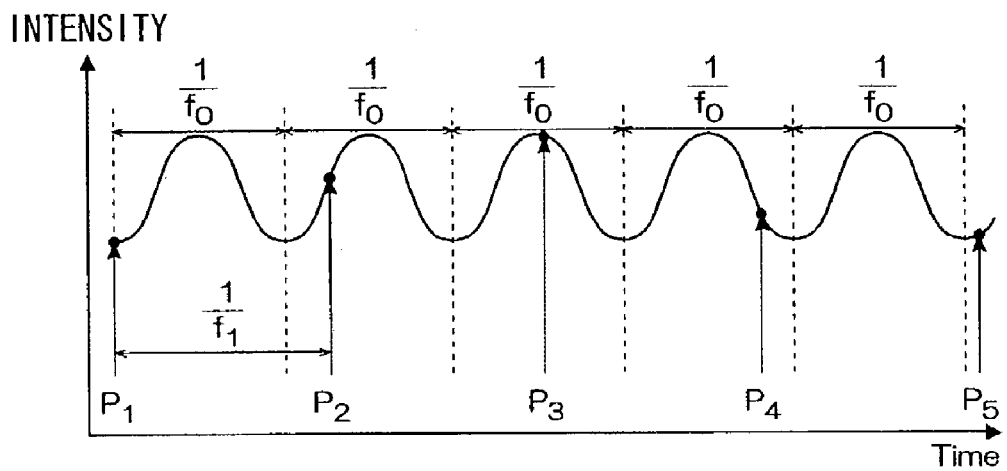
FIG. 9A through FIG. 9D are diagrams showing samples of data plotting according to the embodiments shown in FIG. 1 to FIG. 3.
Figure 9B:
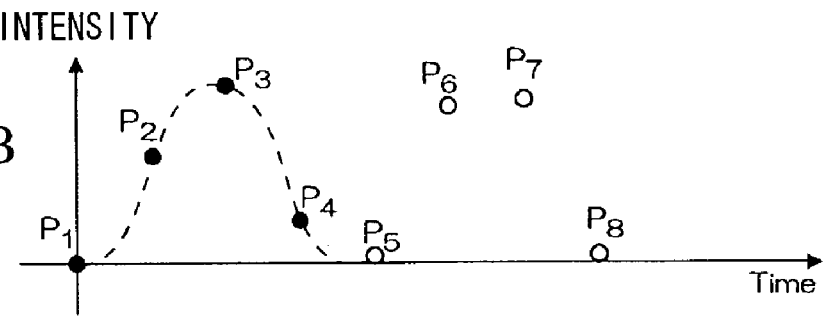
Figure 9C:
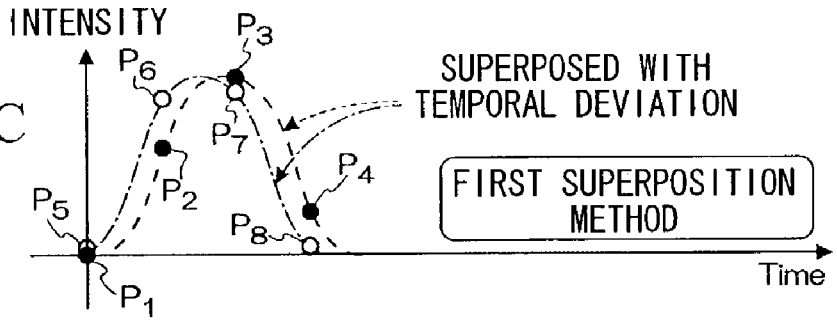
Figure 9D:
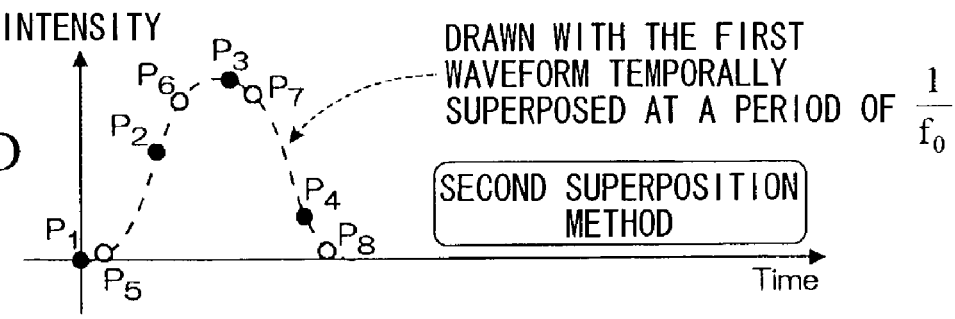
Figure 10:
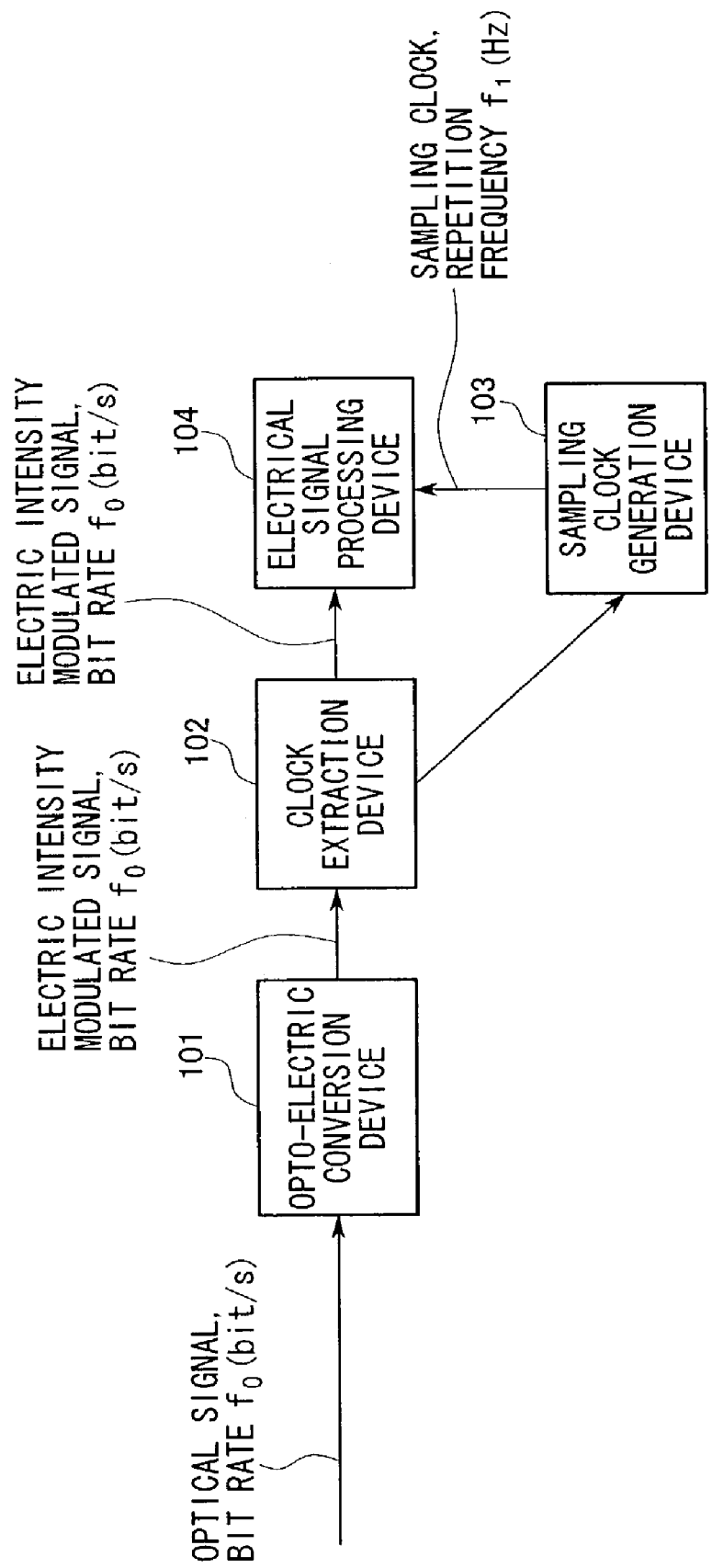
FIG. 10 is a block diagram showing the construction of a conventional example.

Here, n/m is a value relating to the ratio between $f_0$ an $f_1$, and if n/m is *frax*;1;100 and $f_0$ is 10(Gbit/s), for example, then $f_1$ is approximately 100(MHz), showing that the sampling frequency is such that one sampled point is obtained for every approximately 100 bits of the data signal. Furthermore, k is a value relating to the superposition period, indicating that sampled points are superposed in units of k. Furthermore, q is a value indicating how many bits of the data signal are reproduced when k sampled points are arranged in a time series. As an example, plotting examples of the points P1 to P8 each corresponding with a piece of sampled data are described below for a case where $f_1 = (n/m) - a$, with reference to FIG. 9A to FIG. 9D. FIG. 9A is a diagram showing the waveform of a data signal (although only points P1 to P5 are shown in FIG. 9A), and FIG. 9B to FIG. 9D are diagrams showing plotting examples thereof. Furthermore, in this case the variables satisfy n/m=1, k=4 and q=1.

In the case above, the value of the offset frequency a ($=\pm(f_1-f_0)$) is within the range of $(1/5)f_0 \leq a < (1/4)f_0$. In other words, $1/4/f_0 \leq |f_1 - 1/f_0| < 1/3/f_0$ is satisfied, and $\Delta t$ ($=1/f_1-1/f_0$) is set to a value greater than $1/4$ and less than $1/3$ of one timeslot which is the reciprocal of $f_0$. The waveform within one timeslot is reproduced by arranging points P1 to P4 in order (FIG. 9B).

In this example, point P5 is not plotted in a position following point P4, and is instead plotted after returning to time zero. Here, there are two possible superposition methods.

(1) The first super position method involves aligning the time position of point P 5 with the time position of point P1, as shown in FIG. 9C. When the time position of point P5 is aligned to the time position of point P1, the second superposed waveform presents slight temporal deviation relative to the first waveform. In superposing the third and then fourth waveforms in the same manner, the degree of deviation increases gradually, and consequently the eye tends towards closing as the number of superposed waveforms increases. The only information required to realize this superposition is the value of n/m. Because the sampling clock can be set locally, k can be determined arbitrarily within the range of natural numbers, and the superposition period is determined according to k. k is a natural number, and it can be said that a larger value is preferable for the reproduction of a complicated waveform.

(2) The second superposition method involves aligning the time position of point P5 to a multiple of $1/f_0$ as shown in FIG. 9D. If the time position of point P5 is aligned to a multiple of $1/f_0$, the second superposed waveform overlaps the first waveform. However, it is necessary to know the absolute value of $f_0$.

First, the deviation occurring when the time position of point P5 is aligned to the same time position as point P1 in method (1) is estimated. If $a=(\frac{1}{4})f_0$, then point P5 is aligned to point P1 at a period of $1/f_0$, and consequently if superposition is performed in units of four points (or if superposition is performed based on a multiple of four), even if the superposition of waveforms is continued infinitely, a clean eye-diagram can be obtained. However, in this case, as is apparent from the equation above used to define the range of a, a deviates slightly from $(\frac{1}{4})f_0$.

Here, assuming that z is a real number which satisfies $k-1<z\leq k$, then $$a = \frac{\left(\frac{n}{m}\right)^2 q}{z+\left(\frac{n}{m}\right)q} f_0$$

and because in the current case $n/m=1$ and $q=1$, z is a real number which satisfies $3<z<4$, and therefore $a=\{1/(z+1)\}f_0$. Performing the calculations based on these facts shows that in comparison with a case where a $(\frac{1}{4})f_0$, the size $\Delta T$ of the deviation which occurs when superposing waveforms is $\Delta T=(4-z)/(zf_0)$. In other words, if the period of the superposition is ik (where i is a natural number, in this example i=1), then $\Delta T=q(k-z)i/(zf_0)$. In other words, as the waveforms are superposed a second and a third time, and so on, each waveform deviates by an additional $\Delta T$ in the time domain. Once the total deviation equals half the size of a timeslot which is the reciprocal of $f_0$, the eye-diagram is completely closed, and as such this is the upper limit for deviation. If the number of sampled points to be measured at a time is deemed Nsamp, and the number of superposition is deemed I, then $ikj \leq Nsamp$. Accordingly, if the total accumulated deviation is deemed Sum $[\Delta T]$, Sum $[\Delta T]$ is expressed as $$\text{Sum}[\Delta T] = \frac{q(k-z)ij}{zf_0}$$

Because a condition for enabling eye opening evaluation is that this value is equal to or less than half of $1/f_0$, if the number of sampled points is within a range which satisfies $$\frac{(k-z)ijq}{zf_0} \leq \frac{1}{2f_0}$$

that is $$ikj \leq \frac{zk}{2q(k-z)}$$

then the eye opening cm be-evaluated even if a local clock is used.

In other words, when the value of a is $$\frac{\left(\frac{n}{m}\right)^2 q}{z+\left(\frac{n}{m}\right)q} f_0$$

(where z is a real number which satisfies $k-1<z\leq k$) and Nsamp pieces of sampled data are displayed in the order of measurement at a time interval of $dt=1/(zf_0)$ in the time domain, then in the case where a signal eye-diagram is obtained and data signal waveform measurement and quality evaluation are performed by, deeming the time position of the first piece of the sampled data $t=0$, displaying the plurality of pieces of the sampled data in a superposed manner by returning the time position to 0 each time $t=p/f_0$(where p is a natural number), if the number of superposition is deemed j (where j is a natural number), data signal quality evaluation can be performed for the entire number of pieces of the sampled data Nsamp, by satisfying $pkj \leq Nsamp$.

To further expand on the above-described process, evaluation can be performed after repeating j times the process of acquiring Nsamp pieces of data and displaying an eye-diagram as described above, and then superposing j eye-diagrams based on the point where the eye opening is largest. Using this process, the effective number of sampled points used in the evaluation can be increased, thereby further reducing the indeterminacy of the evaluation.

The entire contents of Priority Documents 2002-139006 and 2003-118299 are incorporated herein by reference.

What is claimed is:

1. A data signal quality evaluation method, comprising the steps of:
    after repeating N times (where N is a natural number) a process in which an input optical or electrical data signal with a bit rate of $f_0$(bit/s) is sampled using an optical or electrical sampling pulse train, which is generated independently of the data signal, and which has a repetition frequency $f_1$(Hz) which differs from the bit rate $f_0$(bit/s) and satisfies $f_1=(n/m) f_0 \pm a$, n and m being natural numbers and a being an offset frequency, a thus obtained optical or electrical sampled signal is converted into a piece of electrical digital data, and the piece of the electrical digital data is stored in a buffer;
    reading N pieces of the electrical digital data stored in the buffer at once or sequentially and performing electrical signal processing of the N pieces of the electrical digital data, to obtain a signal eye-diagram and to perform data signal waveform measurement and quality evaluation.

2. A data signal quality evaluation method according to claim 1, wherein a pulse width of the sampling pulse train is equal to or less than $\frac{1}{4}$ of a time determined by the reciprocal of the bit rate $f_0$.

3. A data signal quality evaluation method comprising the steps of:
after repeating N times (where N is a natural number) a process in which an input optical or electrical data signal with a bit rate of $f_0$(bit/s) is sampled using an optical or electrical sampling pulse train, which is generated independently of the data signal, and which has a repetition frequency $f_1$(Hz) which differs from the bit rate $f_0$(bit/s), a thus obtained optical or electrical samples signal is converted into a piece of electrical digital data, and the piece of the electrical digital data is stored in a buffer;
reading N pieces of the electrical digital data stored in the buffer at once or sequentially and performing electrical signal processing of the N pieces of the electrical digital data, to obtain a signal eye-diagram and to perform data signal waveform measurement and quality evaluation;
wherein the repetition frequency $f_1$(Hz) of sampling satisfies $f_1 = (n/m) f_0 \pm a$ (where n and m are natural numbers), and a range of variable a is $$\frac{\left(\frac{n}{m}\right)^2 q}{k+\left(\frac{n}{m}\right)q} f_0 \leq a < \frac{\left(\frac{n}{m}\right)^2 q}{k-1+\left(\frac{n}{m}\right)q} f_0$$

(where k and q are natural numbers).

4. A data signal quality evaluation method according to claim 3, wherein when the value of the variable a is expressed as $$a = \frac{\left(\frac{n}{m}\right)^2 q}{z+\left(\frac{n}{m}\right)q} f_0$$

(where z is a real number which satisfies k−1<z≦k) and pieces of sampled data are displayed in the order of measurement at a time interval of $dt=1/(zf_0)$ in the time domain, the time positions of every ik piece (where i is a natural number) of the sampled data counting from the first piece of the sampled data are superposed and the pieces of the superposed sampled data are displayed, to obtain the signal eye-diagram and to perform the data signal waveform measurement and the quality evaluation, and
wherein when the number of times superposition is performed is j (where j is a natural number), ikj≦Nsamp is satisfied for the total number of pieces of the sampled data Nsamp.

5. A data signal quality evaluation method according claim 3, wherein the variables i and k are values which satisfy ikj≦Nsamp, and satisfy $$ijk \leq \frac{kz}{2q(k-z)}.$$

6. A data signal quality evaluation method according to claim 5, wherein by repeating a plurality of times a process of reading Nsamp pieces of the sampled data stored in the buffer at once or sequentially and performing electrical signal processing to obtain the signal eye-diagram, and superposing signal eye-diagrams so that the eye openings thereof match temporally, the total number of pieces of the sampled data which constitute the signal eye-diagrams is increased, and the data signal waveform measurement and the quality evaluation are performed.

7. A data signal quality evaluation method according to claim 6, wherein either one of an amplitude histogram and a time histogram, determined from a sampled data distribution obtained by dividing an obtained eye-diagram in the intensity domain and the time domain, respectively, is used as a data signal quality parameter.

8. A data signal quality evaluation method according to claim 3, wherein when the value of the variable a is expressed as $$a = \frac{\left(\frac{n}{m}\right)^2 q}{z+\left(\frac{n}{m}\right)q} f_0$$

(where z is a real number which satisfies k−121 z≦k) and pieces of sampled data are displayed in the order of measurement at a time interval of $dt=1/(zf_0)$ in the time domain, the time position of the first piece of the sampled data is deemed t=0 and the pieces of the sampled data are displayed in a superposed manner by returning the time position to zero each time $t=p/f_0$ (where p is a natural number), to obtain the signal eye-diagram and to perform the data signal waveform measurement and the quality evaluation, and
wherein when the number of times superposition is performed is j (where j is a natural number), pkj≦Nsamp is satisfied for the total number of pieces of the sampled data Nsamp.

9. A data signal quality evaluation method according to claim 8, wherein by repeating a plurality of times a process of reading Nsamp pieces of the sampled data stored in the buffer at once or sequentially and performing electrical signal processing to obtain the signal eye-diagram, and superposing signal eye-diagrams so that the eye openings thereof match temporally, the total number of pieces of the sampled data which constitute the signal eye-diagrams is increased, and the data signal waveform measurement and the quality evaluation are performed.

10. A data signal quality evaluation method according to claim 9, wherein either one of an amplitude histogram and a time histogram, determined from a sampled data distribution obtained by dividing an obtained eye-diagram in the intensity domain and the time domain, respectively, is used as a data signal quality parameter.

11. A data signal quality evaluation method according to claim 3, wherein a pulse width of the sampling pulse train is equal to or less than ¼ of a time determined by the reciprocal of the bit rate $f_0$.

12. A data signal quality evaluation apparatus, comprising:
a sampling pulse train generation device which generates an optical or electrical sampling pulse train, independently of an input optical or electrical data signal with a bit rate of $f_0$(bills), and which has a repetition frequency $f_1$(Hz) which differs from the bit rate $f_0$(bit/s) and satisfies $f_1 = (n/m) f_0 \pm a$, n and m being natural numbers and a being an offset frequency;
a data signal sampling device which samples the data signal with the bit rate $f_0$ (bit/s) in accordance with the sampling pulse train to obtain a sampled signal;

a voltage retaining device which converts the sampled signal which is an optical or electrical sampled signal obtained by means of the data signal sampling device into a piece of electrical digital data, and stores a plurality of pieces of the electrical digital data;

an electrical signal processing device which reads the plurality of pieces of the electrical digital data stored in the voltage retaining device at once or sequentially to obtain a signal eye-diagram and to evaluate optical data signal quality parameters; and a trigger signal generation device which applies triggers indicating the start/finish of data acquisition to the voltage retaining device, and applies triggers indicating the start/finish of data read to the electrical signal processing device.

13. A data signal quality evaluation apparatus according to claim 12, wherein a pulse width of the sampling pulse train is equal to or less than ¼ of a time determined by the reciprocal of the bit rate $f_0$.

14. A data signal quality evaluation apparatus comprising:

a sampling pulse train generation device which generates an optical or electrical sampling pulse train, independently of an input optical or electrical data signal with a bit rate of $f_0$(bit/s), and which has a repetition frequency $f_1$(Hz) which differs from the bit rate $f_0$(bit/s);

a data signal sampling device which samples the data signal with the bit rate $f_0$ (bit/s) in accordance with the sampling pulse train to obtain a sampled signal;

a voltage retaining device which converts the sampled signal which is an optical or electrical sampled signal obtained by means of the data signal sampling device into a piece of electrical digital data, and stores a plurality of pieces of the electrical digital data;

an electrical signal processing device which reads the plurality of pieces of the electrical digital data stored in the voltage retaining device at once or sequentially to obtain a signal eye-diagram and to evaluate optical data signal quality parameters; and a trigger signal generation device which applies triggers indicating the start/finish of data acquisition to the voltage retaining device, and applies triggers indicating the start/finish of data read to the electrical signal processing device.

wherein the repetition frequency $f_1$(Hz) of sampling satisfies $f_1=(n/m)f_0\pm a$ (where n and m are natural numbers), and a range of variable a is $$\frac{\left(\frac{n}{m}\right)^2 q}{k+\left(\frac{n}{m}\right)q}f_0 \leq a < \frac{\left(\frac{n}{m}\right)^2 q}{k-1+\left(\frac{n}{m}\right)q}f_0$$

(where k and q are natural numbers).

15. A data signal quality evaluation apparatus according to claim 14, wherein the sampling pulse train generation device has a function which renders the repetition frequency $f_1$(Hz) of the generated sampling pulse train variable, and which when an accurate value for the bit rate $f_0$(bit/s) is unknown, sweeps the value of $f_1$ so that $f_1=(n/m) f_0\pm a$ (where n and m are natural numbers) and $(n/m)^2q/\{k+(n/m)q\}f_0\pm a<(n/m)^2q/\{k+(n/m) q-1\}f_0$ (where k is a natural number) are satisfied.

16. A data signal quality evaluation apparatus according to claim 15, wherein when the value of the variable a is expressed as $$a = \frac{\left(\frac{n}{m}\right)^2 q}{z+\left(\frac{n}{m}\right)q}f_0$$

(where z is a real number which satisfies $k-1<z\leq k$) and the pieces of sampled data are displayed in the order of measurement at a time interval of $dt=/(zf_0)$ in the time domain, the time positions of every ik piece (where i is a natural number) of the sampled data counting from the first piece of the sampled data are superposed and the pieces of the superposed sampled data are displayed, to obtain the signal eye-diagram and to perform data signal waveform measurement and quality evaluation, and wherein when the number of times superposition is performed is j (where j is a natural number), $ikj\leq Nsamp$ is satisfied for the total number of pieces of the sampled data Nsamp.

17. A data signal quality evaluation apparatus according to claim 16, wherein the variables i, k are values which satisfy $ikj\leq Nsamp$, and satisfy $$ijk \leq \frac{kz}{2q(k-z)}.$$

18. A data signal quality evaluation apparatus according to claim 17, wherein when an accurate value for the bit rate $f_0$(bit/) is unknown, the electrical signal processing device sweeps at least one of the value of k, the value of n/m and the value of q so that the repetition frequency $f_1$(Hz) of sampling satisfies $f_1=(n/m) f_0\pm a$ (where n and m are natural numbers) and $(n/m)^2q/\{k+(n/m)q\}f_0\leq a<(n/m)^2q/\{k+(n/m) q-1\}f_0$(where k is a natural number), and $ikj\leq Nsamp$ and $ikj\leq kz/\{2q(k-z)\}$(where i, j, and Nsamp are natural numbers) are satisfied.

19. A data signal quality evaluation apparatus according to claim 18, wherein the electrical signal processing device repeats a plurality of times a process of reading the Nsamp pieces of the sampled data stored in the voltage retaining device at once or sequentially and obtaining a signal eye-diagram, and wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

20. A data signal quality evaluation apparatus according to claim 19, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

21. A data signal quality evaluation apparatus according to claim 18, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

22. A data signal quality evaluation apparatus according to claim 17, wherein the electrical signal processing device repeats a plurality of times a process of reading the Nsamp pieces of the sampled data stored in the voltage retaining device at once or sequentially and obtaining a signal eye-diagram, and wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

23. A data signal quality evaluation apparatus according to claim 22, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

24. A data signal quality evaluation apparatus according to of claim 17, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

25. A data signal quality evaluation apparatus according to claim 16, wherein the electrical signal processing device repeats a plurality of times a process of reading the Nsamp pieces of the sampled data stored in the voltage retaining device at once or sequentially and obtaining a signal eye-diagram, and wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

26. A data signal quality evaluation apparatus according to claim 25, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

27. A data signal quality evaluation apparatus according to claim 16, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

28. A data signal quality evaluation apparatus according to claim 15, wherein when the value of the variable a is expressed as $$a = \frac{\left(\frac{n}{m}\right)^2 q}{z + \left(\frac{n}{m}\right)q} f_0$$

(where z is a real number which satisfies k−1<z k)

and pieces of sampled data are displayed in the order of measurement at a time interval of $dt=1/(zf_0)$ in the time domain, the time position of the first piece of the sampled data is deemed t=0 and the pieces of the sampled data are displayed in a superposed manner by returning the time position to zero each time $t=p/f_0$ (where p is a natural number), to obtain a signal eye-diagram and to perform data signal waveform measurement and quality evaluation, and wherein when the number of times superposition is performed is j (where j is a natural number), $pkj \leq Nsamp$ is satisfied for the total number of pieces of the sampled data Nsamp.

29. A data signal quality evaluation apparatus according to claim 28, wherein the electrical signal processing device repeats a plurality of times a process of reading the Nsamp pieces of the sampled data stored in the voltage retaining device at once or sequentially and obtaining a signal eye-diagram, and wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

30. A data signal quality evaluation apparatus according to claim 29, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

31. A data signal quality evaluation apparatus according to claim 28, wherein
the electrical signal processing device comprises at least one of an amplitude histogram evaluation section which determines an amplitude histogram as a data signal quality parameter and a time histogram evaluation section which determines a time histogram as a data signal quality parameter, and
the amplitude histogram and the time histogram are determined from a sampled data distribution obtained by dividing a signal eye-diagram in the amplitude domain and the time domain, respectively.

32. A data signal quality evaluation apparatus according to claim 14, wherein when the value of the variable a is expressed as $$a = \frac{\left(\frac{n}{m}\right)^2 q}{z + \left(\frac{n}{m}\right)q} f_0$$

(where z is a real number which satisfies k−1<z≦k)
and pieces of sampled data are displayed in the order of measurement at a time interval of dt=1/(zf$_0$) in the time domain, the time positions of every ik piece (where i is a natural number) of the sampled data counting from the first piece of the sampled data are superposed and the pieces of the superposed sampled data are displayed, to obtain the signal eye-diagram and to perform data signal waveform measurement and quality evaluation, and
wherein when the number of times superposition is performed is j (where j is a natural number), ikj≦Nsamp is satisfied for the total number of pieces of the sampled data Nsamp.

33. A data signal quality evaluation apparatus according to claim 32, wherein the variables i, kare values which satisfy ikj≦Nsamp, and satisfy $$ijk \le \frac{kz}{2q(k-z)}.$$

34. A data signal quality evaluation apparatus according to claim 33, wherein when an accurate value for the bit rate f$_0$(bit/s) is unknown, the electrical signal processing device sweeps at least one of the value of k, the value of n/m and the value of q so that the repetition frequency f$_1$(Hz) of sampling satisfies f$_1$=(n/m)f$_0$±a (where n and m are natural numbers) and (n/m)$^2$q/{k+(n/m)q}f$_0$≦a<(n/m)$^2$fq/{k+(n/m)q−1}f$_0$(where k is a natural number), and ikj≦Nsamp and ikj≦kz/{2q (k−z)} (where i, j, and Nsamp are natural numbers) are satisfied.

35. A data signal quality evaluation apparatus according to claim 34, wherein the electrical signal processing device repeats a plurality of times a process of reading the Nsamp pieces of the sampled data stored in the voltage retaining device at once or sequentially and obtaining a signal eye-diagram, and
wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

36. A data signal quality evaluation apparatus according to claim 35, wherein
the electrical signal processing device comprises at least one of an amplitude histogram evaluation section which determines an amplitude histogram as a data signal quality parameter and a time histogram evaluation section which determines a time histogram as a data signal quality parameter, and
the amplitude histogram and the time histogram are determined from a sampled data distribution obtained by dividing a signal eye-diagram in the amplitude domain and the time domain, respectively.

37. A data signal quality evaluation apparatus according to claim 34, wherein
the electrical signal processing device comprises at least one of an amplitude histogram evaluation section which determines an amplitude histogram as a data signal quality parameter and a time histogram evaluation section which determines a time histogram as a data signal quality parameter, and
the amplitude histogram and the time histogram are determined from a sampled data distribution obtained by dividing a signal eye-diagram in the amplitude domain and the time domain, respectively.

38. A data signal quality evaluation apparatus according to claim 33, wherein the electrical signal processing device repeats a plurality of times a process of reading the Nsamp pieces of the sampled data stored in the voltage retaining device at once or sequentially and obtaining a signal eye-diagram, and
wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

39. A data signal quality evaluation apparatus according to claim 38, wherein
the electrical signal processing device comprises at least one of an amplitude histogram evaluation section which determines an amplitude histogram as a data signal quality parameter and a time histogram evaluation section which determines a time histogram as a data signal quality parameter, and
the amplitude histogram and the time histogram are determined from a sampled data distribution obtained by dividing a signal eye-diagram in the amplitude domain and the time domain, respectively.

40. A data signal quality evaluation apparatus according to claim 30, wherein
the electrical signal processing device comprises at least one of an amplitude histogram evaluation section which determines an amplitude histogram as a data signal quality parameter and a time histogram evaluation section which determines a time histogram as a data signal quality parameter, and
the amplitude histogram and the time histogram are determined from a sampled data distribution obtained by dividing a signal eye-diagram in the amplitude domain and the time domain, respectively.

41. A data signal quality evaluation apparatus according to claim 32, wherein the electrical signal processing device repeats a plurality of times a process of reading the Nsamp pieces of the sampled data stored in the voltage retaining device at once or sequentially and obtaining a signal eye-diagram, and wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

42. A data signal quality evaluation apparatus according to claim 41, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

43. A data signal quality evaluation apparatus according to claim 32, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

44. A data signal quality evaluation apparatus according to claim 14, wherein when the value of the variable a is expressed as $$a = \frac{\left(\frac{n}{m}\right)^2 q}{z + \left(\frac{n}{m}\right) q} f_0$$

(where z is a real number which satisfies k−1≦z≦k) and pieces of sampled data are displayed in the order of measurement at a time interval of dt=1/(zf$_0$) in the time domain, the time position of the first piece of the sampled data is deemed t=0 and the pieces of the sampled data are displayed in a superposed manner by returning the time position to zero each time t=p/f$_0$(where p is a natural number), to obtain a signal eye-diagram and to perform data signal waveform measurement and quality evaluation, and wherein when the number of times superposition is performed is j (where j is a natural number), pkj≦Nsamp is satisfied br the total number of pieces of the sampled data Nsamp.

45. A data signal quality evaluation apparatus according to claim 44, wherein the electrical signal processing device repeats a plurality of times a process of reading the Nsamp pieces of the sampled data stored in the voltage retaining device at once or sequentially and obtaining a signal eye-diagram, and wherein the data signal quality evaluation apparatus further comprises an eye opening evaluation section which evaluates the eye-opening of signal eye-diagrams, and the total number of pieces of the sampled data which constitute the signal eye-diagrams for the data signal waveform measurement and the quality evaluation is increased by superposing the signal eye-diagrams so that the eye openings thereof match temporally.

46. A data signal quality evaluation apparatus according to claim 45, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

47. A data signal quality evaluation apparatus according to claim 44, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

48. A data signal quality evaluation apparatus according to claim 14, wherein the electrical signal processing device comprises at least one of an amplitude histogram evaluation section which determines an amplitude histogram as a data signal quality parameter and a time histogram evaluation section which determines a time histogram as a data signal quality parameter, and the amplitude histogram and the time histogram are determined from a sampled data distribution obtained by dividing a signal eye-diagram in the amplitude domain and the time domain, respectively.

49. A data signal quality evaluation apparatus according to claim 14, wherein a pulse width of the sampling pulse train is equal to or less than ¼ of a time determined by the reciprocal of the bit rate f$_0$.

* * * * *

UNITED STATES PATENT AND TRADEMARK OFFICE
CERTIFICATE OF CORRECTION

PATENT NO.        : 7,190,752 B2
APPLICATION NO.   : 10/434840
DATED             : March 13, 2007
INVENTOR(S)       : Ippei Shake et al.

It is certified that error appears in the above-identified patent and that said Letters Patent is hereby corrected as shown below:

Column 8, Line 51, "M" should be -- n --.
Column 8, Line 52, "$\leqq$" should be -- $\leq$ --
Column 8, Line 58, "ikj$\leqq$Nsamp" should be -- ikj $\leq$Nsamp --
Column 8, Line 58, "ikj$\leqq$kz/{2q(k-z)}" should be -- ikj$\leq$kz/{2q(k-z)} --
Column 9, Line 2, "$\geqq$" should be -- $\geq$ --
Column 9, Line 4, "$\geqq$" should be -- $\geq$ --
Column 10, Line 48, "$\leqq$" should be -- $\leq$ --
Column 10, Line 49, "$\leqq$" should be -- $\leq$ --
Column 11, Line 26, "$\leqq$" should be -- $\leq$ --
Column 11, Line 50, "$\leqq$" should be -- $\leq$ --
Column 12, Line 17, "$\leqq$" should be -- $\leq$ --
Column 12, Line 31, "$\leqq$" should be -- $\leq$ --

Column 13

Line 16, Claim 3, "eve" should be -- eye --
Line 40, Claim 4, "$\leqq$" should be -- $\leq$ --
Line 50, Claim 4, "$\leqq$" should be -- $\leq$ --
Line 55, Claim 5, "$\leqq$" should be -- $\leq$ --

Column 14

Line 21, Claim 8, "k-121 z $\leqq$k" should be --k-1<z$\leq$k --
Line 32, Claim 8, "$\leqq$" should be -- $\leq$ --
Line 61, Claim 12, "(bills)" should be -- (bit/s) --

Column 15

Line 24, Claim 14, "$f_0$(bit/s" should be -- $f_0$(bit/s) --
Line 25, Claim 14, "$f_0$(bit/s" should be -- $f_0$(bit/s) --
Line 63, Claim 15, "$\pm$" should be -- $\leq$ --

UNITED STATES PATENT AND TRADEMARK OFFICE
CERTIFICATE OF CORRECTION

| | | |
|---|---|---|
| PATENT NO. | : 7,190,752 B2 | |
| APPLICATION NO. | : 10/434840 | |
| DATED | : March 13, 2007 | |
| INVENTOR(S) | : Ippei Shake et al. | |

It is certified that error appears in the above-identified patent and that said Letters Patent is hereby corrected as shown below:

Column 16

Line 8, Claim 16, "≦" should be -- $\leq$ --

Line 10, Claim 16, insert 1: "dt=/(zf$_0$)" should be --dt=1/(zf$_0$) --

Line 18, Claim 16, "≦" should be -- $\leq$ --

Line 23, Claim 17, "≦" should be -- $\leq$ --

Line 32, Claim 18, "(bit/)" should be -- (bit/s) --

Line 36, Claim 18, "≦" should be -- $\leq$ --

Line 37, Claim 18, "≦" should be -- $\leq$ --

Line 38, Claim 18, "≦" should be -- $\leq$ --

Column 18

Line 31, Claim 28, insert $\leq$: "k-1<z k)" should be -- k-1<z$\leq$k) --

Line 41, Claim 28, "≦" should be -- $\leq$ --

Column 19

Line 26, Claim 32, "≦" should be -- $\leq$ --

Line 36, Claim 32, "≦" should be -- $\leq$ --

Line 40, Claim 33, insert space between k and are: should be -- i, k are --

Line 41, Claim 33, "≦" should be -- $\leq$ --

Line 54, Claim 34, . . . "(n/m)q} f$_0$≦a<" . . . should be . . . -- (n/m)q} f$_0 \leq$a<" --. . .

Line 54, Claim 34, delete . . . "f" . . . "(n/m)$^2$fq/" . . . should be . . . -- (n/m)$^2$q/ -- . . .

Line 55, Claim 34, "≦" should be -- $\leq$ --

Line 56, Claim 34, "≦" should be -- $\leq$ --

UNITED STATES PATENT AND TRADEMARK OFFICE
CERTIFICATE OF CORRECTION

PATENT NO. : 7,190,752 B2
APPLICATION NO. : 10/434840
DATED : March 13, 2007
INVENTOR(S) : Ippei Shake et al.

It is certified that error appears in the above-identified patent and that said Letters Patent is hereby corrected as shown below:

Column 21

Line 49, Claim 44, "$k-1 \leqq z \leqq k$" should be -- $k-1 < z \leq k$ --

Line 59, Claim 44, "$\leqq$" should be -- $\leq$ --

Line 60, Claim 44, "br" should be -- for --

Signed and Sealed this

Twenty-fourth Day of July, 2007

JON W. DUDAS
*Director of the United States Patent and Trademark Office*